United States Patent [19]

Kablitz et al.

[11] Patent Number: 4,476,297

[45] Date of Patent: Oct. 9, 1984

[54] PROCESS FOR REMOVING CATALYST RESIDUES FROM POLYOLEFINS

[75] Inventors: Hans-Jürgen Kablitz, Liederbach; Helmut Strametz, Frankfurt am Main, both of Fed. Rep. of Germany

[73] Assignee: Hoechst Aktiengesellschaft, Fed. Rep. of Germany

[21] Appl. No.: 407,123

[22] Filed: Aug. 11, 1982

[30] Foreign Application Priority Data

Aug. 21, 1981 [DE] Fed. Rep. of Germany ....... 3133101

[51] Int. Cl.$^3$ .............................................. C08F 6/08
[52] U.S. Cl. ..................................... 528/486; 528/498
[58] Field of Search .......................................... 528/486

[56] References Cited

U.S. PATENT DOCUMENTS

| | | | |
|---|---|---|---|
| 2,827,445 | 3/1958 | Bartolomeo et al. | 260/94.9 |
| 3,164,578 | 1/1965 | Baker et al. | 260/94.9 |
| 3,269,997 | 8/1966 | Lyons | 528/486 |
| 3,287,343 | 11/1966 | Kutner | 528/486 |
| 3,499,880 | 3/1970 | Kutner | 528/486 |

FOREIGN PATENT DOCUMENTS 1363804  5/1964  France .

*Primary Examiner*—Christopher A. Henderson
*Attorney, Agent, or Firm*—Connolly & Hutz

[57] ABSTRACT

In polyolefins, the content of titanium and light metal halides and aluminum compounds emanating from the catalyst system can be considerably reduced by treatment with a higher, preferably branched, aliphatic monocarboxylic acid having 6 to 10 carbon atoms.

2 Claims, No Drawings

PROCESS FOR REMOVING CATALYST RESIDUES FROM POLYOLEFINS

The present invention relates to a process for removing catalyst residues from polyolefins prepared with the use of mixed catalysts containing light metal halides and titanium and aluminum compounds.

To polymerize ethylene and higher olefins such as propylene and for copolymerizing ethylene with higher olefins, catalyst systems are used, the transition metal component of which contains relatively large amounts of magnesium chloride, or another magnesium halide, and, under certain circumstances, also halides of aluminum and of alkali and alkaline earth metals. The polymerization activity of such a system can be very high, so that it is possible to prepare polyolefins which contain only small amounts of catalyst residues. For many areas of use it is therefore possible to omit a purification step to remove catalyst residues from the polymers. However, some applications of polyolefins require extremely low amounts of contaminants. In addition, it can also be advantageous, or even necessary, to dispense with corrosion-inhibiting additives in the polymer. This is true, for example, for the preparation of fibers having very fine deniers, of thin films and for use as insulating material (dielectric media in condensers and cable sheaths) and for food packaging. In these cases, the catalyst residues must be removed.

It is known that polypropylene prepared with the use of catalysts containing magnesium chloride can be purified by adding an aliphatic alcohol having 3 to 8 carbon atoms to a suspension of the polymer in an inert hydrocarbon (cf. German Offenlegungsschrift No. 2,436,989).

To remove catalyst residues mainly comprised of magnesium chloride in a first treatment step with the exclusion of water and alcohols it is also possible to use aliphatic monocarboxylic acids having 1 to 3 carbon atoms, while the use of higher carboxylic acids having more than 3 carbon atoms is considered unfavorable (c.f. Japanese Preliminary Published Application No. Sho 52/49,285). The treatment can be carried out in a suspension in an inert diluent, in the gas phase or in the melt. In a second step, water, alkalis, inert gas or vacuum can be used for aftertreating.

A purification process for removing magnesium chloride from polyolefins is also known, the process being carried out with the aid of aromatic monocarboxylic acids, polycarboxylic acids or hydroxycarboxylic acids, preferably aliphatic polycarboxylic acids having 2 to 6 carbon atoms, and in the melt with the exclusion of water (c.f. Japanese Preliminary Published Application No. Sho 52/69,488).

The use of glycol monoethers to remove magnesium chloride from polypropylene is also known (cf. Japanese Preliminary Published Application No. Sho 54/142,290).

Finally, the use of anhydrides of long-chain aromatic or bifunctional carboxylic acids or of carboxylates or lactones for the removal of halogen-containing catalyst constituents has also been described (Japanese Preliminary Published Application No. Sho 55/147,508, Japanese Preliminary Published Application No. Sho 55/147,509 and Japanese Preliminary Published Application No. Sho 55/147,510).

The disadvantages of the additives described above, for the purification of polypropylene, are that their effectiveness in respect of the removal of light metal halides, in particular magnesium chloride, leaves something to be desired. Either large amounts of several percent by weight of the corresponding chemicals must be added, or very high temperatures or even several treatment steps are necessary to obtain the purification effect desired. Additives having a low boiling point also have the additional disadvantage that they can become concentrated in the unconverted monomer or in the inert diluent. Certain of these materials also tend to react in an unclear manner with the catalyst constituents, so that there is a resulting profusion of by-products, which can contaminate the excess monomer and the diluent and be separated off only with difficulty.

It has now been found that the content of titanium and light metal halides and aluminum compounds in polyolefins, which emanates from the catalyst system, can be considerably lowered by treatment with a higher, preferably branched, aliphatic monocarboxylic acid having 6 to 10 carbon atoms.

The invention thus relates to a process for removing catalyst residues from polyolefins prepared by means of catalysts containing light metal halides and titanium and aluminum compounds by treating the polyolefin suspended in a liquid medium, with an aliphatic monocarboxylic acid and separating off and washing out the polyolefin, which process comprises carrying out this treatment with 0.1 to 1.5% by weight relative to dry polyolefin, of at least one monocarboxylic acid having 6 to 10 carbon atoms at a temperature of 40° to 90° C. for 10 to 120 minutes.

The process according to the invention is suitable for all homopolymers and copolymers of ethylene, propylene and higher 1-olefins prepared with the use of catalyst systems which, in addition to titanium halides, predominantly contain light metal halides, in particular magnesium halides, and aluminum alkyl compounds.

The process is carried out in a liquid medium, advantageously directly after the polymerization of the olefin. If the polymerization took place in a suspension, either in liquid monomer or in an inert diluent, the suspension, if necessary, can be diluted with a low-boiling diluent. If, on the other hand, the polymerization took place in the gas phase, in which the polymer is obtained as a powder, a suspension of the polymer in a low-boiling diluent, for example a butane, pentane or hexane fraction, is prepared.

The treatment of the polymer is carried out at a temperature of 40° to 90° C., preferably 60° to 75° C. The treatment time depends on the porosity and particle size distribution of the polymer particles and is within the range from 10 to 120 minutes, preferably 30 to 60 minutes. The amount of treatment agent is related to the productivity of the catalyst component containing titanium halide and light metal halide and with the amount of aluminum alkyl compound used as co-catalyst and is within the range from 0.1 to 1.5% by weight, preferably 0.2 to 0.5% by weight, relative to dry polymer. The process can be carried out not only discontinuously but also continuously. It is particularly advantageous when the treatment agent acts on the polymer in a countercurrent wash.

For this purpose, the polymer suspension is introduced into a washing tower provided with a stirrer and baffles, the liquid phase containing the treatment agent moving upwards while the polymer particles sink to the bottom.

In a continuous operation, the catalyst residues can also be removed in a stirred vessel or in two or more units connected in series.

In the process according to the invention, the treatment agent used is at least one aliphatic, preferably branched, monocarboxylic acid having 6 to 10, preferably 7 to 9 carbon atoms. Examples of such acids are n-hexanoic acid (caproic acid), isobutylacetic acid, sec.-butylacetic acid, diethylacetic acid, methyl-n-propylacetic acid, methyl-i-propylacetic acid, dimethylethylacetic acid, n-heptanoic acid (oenanthic acid), methylbutylacetic acid, ethyl-n-propylacetic acid, methyldiethylacetic acid, n-octanoic acid (caprylic acid), 2-ethylhexanoic acid, i-octanoic acid, isomeric nonanoic acids and isomeric decanoic acids. Preferably products or product mixtures obtained by hydroformylation from higher monoolefins and subsequent oxidation are used. These are, for example in the case of i-octanoic acid (IOA) and i-nonanoic acid (INA), which are preferably used, mixtures of isomeric $C_8$- or $C_9$-carboxylic acids. 2-Ethylhexanoic acid (2-EHA) is particularly preferred.

The acids can be used in pure form or mixed.

PROPERTIES OF ACIDS WHICH ARE PREFERABLY USED

| | Determination method | 2-EHA | IOA | INA | Dimension |
|---|---|---|---|---|---|
| Boiling range (under 1,013 mbar) | DIN 51,751 | 226–230 | 225–241 | 232–246 | °C. |
| Density (at 20° C.) | DIN 51,757 | 0.905–0.907 | 0.912–0.919 | 0.895–0.902 | g/cm$^3$ |
| Refractive index n$_D^{20}$ | DIN 53,491 | 1.425–1.426 | 1.429–1.431 | 1.429–1.431 | |
| Acid number | DIN 53,402 | >385 | >380 | >347 | mg KOH/g |
| Viscosity (at 20° C.) | DIN 51,550 | 7.7 | ≈7.5 | 11.2 | mPa · s |

As already mentioned, the process according to the invention can be applied to any system obtained with the aid of a magnesium- and titanium-containing catalyst component A and a co-catalyst B containing an aluminum alkyl compound.

Component A of this catalyst can be prepared, for example, by reacting the reaction product of a magnesium halide and an electron donor and/or of a cyclopolyene with the reaction product of titanium tetrachloride with an aluminum-organic compound at temperatures of −50° to +80° C. (cf., for example, German Offenlegungsschrift No. 2,830,039). The component can also be prepared by reacting the reaction product of a magnesium halide and an electron donor compound with titanium tetrachloride (c.f. German Offenlegungsschrift No. 2,643,143) by reacting magnesium ethylate with titanium tetrachloride (c.f., for example, German Auslegeschrift No. 1,795,197). Another possibility comprises reacting a magnesium halide with a reaction product of titanium tetrachloride with an electron donor (c.f., for example, German Offenlegungsschrift No. 2,230,672).

The reactions of the magnesium halide with the various additives are generally effected by milling. It is possible in these reactions, if desired, to add to the magnesium halide yet other inorganic compounds which can later be partially removed likewise by the process according to the invention, such as LiCl, Na$_2$SO$_4$, CaCl$_2$, CaCO$_3$, CaSO$_4$, MgO, AlCl$_3$, Al$_2$O$_3$, SiO$_2$ or TiO$_2$. It is also possible simultaneously or successively to use several electron donor compounds, which in turn can also form complexes, for example with AlCl$_3$ or TiCl$_4$.

Co-catalyst B can be comprised of an aluminum alkyl compound of the formula AlR$_3$ or AlR$_2$Hal, where R can be a straight-chain or branched alkyl radical and Hal can be a chloride or bromide radical. The compounds aluminum triethyl, aluminum triisobutyl and aluminum diethyl chloride are preferably used.

However, the reaction products of aluminum triisobutyl and of aluminum diisobutyl hydride with dienes, for example isoprene, are also suitable. The latter reaction product is commercially available as aluminum isoprenyl.

In particular in the polymerization in the presence of propylene, the aluminum alkyl compound is as a rule used in the form of a complex with an electron donor compound. Esters of carboxylic acids are particularly suitable for this use. However, ethers, thioethers, nitrogen and phosphorus compounds and cyclopolyenes can also be used, either singly or as mixtures. The electron donor compound can also be metered separately from the co-catalyst as component C directly into the polymerization mixture.

The process according to the invention can be used for removing the residues of any catalyst system of the abovementioned type, regardless of whether these catalyst systems are used for preparing a homopolymer or a random or block copolymer. The process is particularly effective in the case of any homopolymers and copolymers of propylene. Its application reduces above all the content of aluminum, magnesium, titanium and chloride. The low-ash products thereby obtained can be used with great advantage for preparing films and cable sheaths having high breakdown resistance and a low dielectric loss factor. The corrosive action of the products on processing machines is considerably reduced. As a result the amount of acid scavenger added to the polymer, such as, for example, Ca stearate, magnesium oxide or hydrotalcite, can be drastically lowered. The odor of containers and packaging materials for food is also strongly reduced. The examples which follow are intended to illustrate the invention.

EXAMPLE 1

A TiCl$_3$-containing catalyst component A which had been prepared in accordance with Example 1 of German Offenlegungsschrift No. 2,830,039 was used for the polymerization of propylene.

702 g of anhydrous magnesium chloride (7.37 moles) and 170.4 g of ethyl benzoate (1.13 moles) were milled for 100 hours in a vibrating ball mill in an atmosphere of nitrogen. The steel vessel used had a capacity of 5 liters. 15 kg of stainless steel balls having a diameter of 15 mm were used.

1,090 ml of a hydrogenated, oxygen-free gasoline fraction (boiling point 130° to 170° C.) and 550 ml of titanium tetrachloride (5 moles) were initially introduced into a 10 liter stirred vessel with the exclusion of air and moisture. A solution of 1,111.2 g of aluminum ethyl sesquichloride (which contains 4.5 moles of aluminum diethyl monochloride) in 3,334 g of the same gasoline fraction is added dropwise with stirring (250 rpm) at 0° C. in the course of 8 hours under a blanket of nitrogen. A red-brown fine precipitate formed. Stirring was then continued for 2 hours at 0° C. and then for 12 hours at room temperature.

The batch was then heated with stirring and under a blanket of nitrogen for 4 hours at 60° C. After the mixture had cooled down and the precipitate had settled out, the supernatant mother liquor was decanted off, and the solid reaction product was washed three times with 2,000 ml of the gasoline fraction in each case. For the subsequent reactions, the solid was suspended in an amount of the gasoline fraction which was such that a concentration of 1 mole of $TiCl_3$ per 1 liter was obtained. The content of trivalent titanium in the suspension was determined by titration with a $Ce^{III}$ solution.

6.56 g of the reaction product of magnesium chloride and ethyl benzoate were suspended in 100 ml of the gasoline fraction. 19.3 ml (19.3 mmoles of Ti) of the $TiCl_3$-containing suspension were added with stirring in the course of 10 minutes at 80° C. under a blanket of argon. The reaction mixture was then maintained for 2 hours at 80° C. After the batch had cooled down to room temperature, the solid (catalyst component A) was filtered off with suction while air and moisture were excluded and washed twice with 100 ml of the gasoline fraction in each case and suspended in 100 ml of gasoline fraction. The titanium content was determined by colorimetry and adjusted to 1 mole per liter.

35 liters of liquid propylene and 0.2 bar of hydrogen were initially introduced at room temperature with the exclusion of air and moisture into a 70 liter stirred autoclave, and the catalyst components, each diluted with 5 liters of liquid propylene, were added from a lock vessel in the following order and the following amounts:

80 mmoles (=10.97 ml) of aluminum triethyl, 25 mmoles (=25 ml of a 1 molar hexane solution) of methyl p-toluylate and, finally, 1 mmole of titanium in the form of 11.5 ml of a mixture in hexane and containing the above catalyst component A.

Heat was supplied and the vessel contents were heated in the course of 10 minutes to a temperature of 75° C., whereupon the polymerization commenced, and then maintained at this temperature. The pressure in the vessel was 34 bar. After a polymerization time of 3 hours, the reaction slowed down.

In accordance with the expected yield, 11.4 g of 2-ethylhexanoic acid (2-EHA) were metered in, and stirring was continued for a further 30 minutes at an internal temperature of 70° C. The suspension was then filtered at 70° C. through a suction filter. 30 liters of liquid propylene were then again added to the solid residue, and the mixture was stirred for 30 minutes at 70° C. After renewed filtration of the suspension through the suction filter, the solid was washed with hexane at room temperature onto another suction filter, filtered off and dried at 70° C. in a vacuum drying cabinet. The yield was 5.84 kg, which corresponds to 122 kg of PP per g of Ti, from which the amount of 2-ethylhexanoic acid added can be calculated to be 0.2% by weight. The polymer had a bulk density of 460 g/l and an indentation hardness, measured according to DIN 53,456, of 84 $N/mm^2$. The melt flow index MFI 230/5, measured according to DIN 53,012, was 17 g/10 minutes. In the polymerization, 2.4% by weight of soluble (atactic) polypropylene (relative to total polymer) were formed. Analytically determined residual contents of catalyst constitutents are indicated in Table 1.

EXAMPLES 2 AND 3

The polymerization according to Example 1 was repeated several times, the amounts of 2-ethylhexanoic acid added being increased in a stepwise manner and the treatment temperature being changed. The experimental results correspond to Example 1 with the exception of the results listed in Table 1.

EXAMPLES 4 AND 5

Further polymerizations in accordance with Example 1 were carried out, followed by the addition of i-octanoic acid (IOA) or of i-nonanoic acid (INA) to remove the catalyst residues. The reduction obtained in these residues in relation to the catalyst yield is shown in Table 2.

COMPARATIVE EXAMPLE 1

The polymerization is carried out in accordance with Example 1, but without a subsequent removal of the catalyst residues being carried out. The content of these residues in the polymer in relation to the catalyst yield is indicated in Table 1.

EXAMPLE 6

A titanium-containing catalyst component A was used which had been prepared in line with Example 1 of German Offenlegungsschrift No. 2,643,143 as follows:

530 g of anhydrous magnesium chloride (5.57 moles, containing less than 1% by weight of water) and 280 g of ethyl benzoate (1.86 moles) were milled for 100 hours in a vibrating mill under an atmosphere of nitrogen. The steel vessel used had a capacity of 5 liters. 15 kg of stainless steel balls having a diameter of 15 mm were used. 25 g of the milled product were introduced under an atmosphere of nitrogen into a 500 ml stirred vessel and suspended there in 375 g of $TiCl_4$. The suspension was stirred for 2 hours at 80° C. and then filtered at this temperature. The residue was washed five times with boiling heptane and dried.

35 liters of liquid propylene and 0.2 bar of hydrogen were initially introduced at room temperature with the exclusion of air and moisture into a 70 liter stirred autoclave, and the catalyst components, each diluted with 5 liters of liquid propylene, were added from a lock vessel in the following order and the following amounts:

40 mmoles (=5.5 ml) of aluminum triethyl, 12.5 mmoles (=12.5 ml of a 1 molar hexane solution) of methyl p-toluylate and, finally, 0.125 mmoles of titanium in the form of 0.36 g of the above catalyst component. Heat was applied and the vessel contents were heated in the course of 10 minutes to a temperature of 70° C.—whereupon the polymerization commenced——and then maintained at this temperature. The pressure in the vessel was 34 bar. After a polymerization time of one hour, the polymerization slowed down.

According to the expected yield, 11 g of 2-ethylhexanoic acid (2-EHA) were metered in, and the further procedure followed was in accordance with Example 1. The yield of isolated main product was 3.3 kg, which corresponds to 550 kg of PP per g of titanium, from which the amount of 2-EHA added is calculated as 0.33% by weight. Analytically determined residual contents of catalyst constituents are indicated in Table 2.

EXAMPLES 7 AND 8

The polymerizations in accordance with Example 6 were repeated, an increased amount of 2-EHA or i-nonanoic acid being used to remove the catalyst residues. The results are listed in Table 2.

EXAMPLE 9

The catalyst component A prepared in accordance with Example 6 and containing titanium was used. 35 liters of liquid propylene and 0.4 bar of hydrogen were initially introduced at room temperature with the exclusion of air and moisture into a 70 liter stirred autoclave, and the catalyst components, each diluted with 5 liters of liquid propylene, were added from a lock vessel in the following order and the following amounts:

40 mmoles (=5.5 ml) of aluminum triethyl, 12.6 mmoles of methyl p-toluylate and 0.15 mmole of titanium in the form of 0.43 g of the above catalyst component A. Heat was applied and the vessel contents were heated in the course of 10 minutes to a temperature of 70° C., whereupon the polymerization commenced. After a polymerization time of 50 minutes at 70° C. and under a pressure of 30 bar, the batch was cooled down in the course of 5 minutes to 60° C. and continuously supplied for 20 minutes with an amount of ethylene which was such that the total pressure was 35 bar. A total of 1,720 liters (S.T.P.) of ethylene were passed in. 20 g of 2-ethylhexanoic acid (2-EHA), which corresponded to the amount of monomer passed in, were then added, and the further procedure used was in accordance with Example 1. The yield of block copolymer was 2.1 kg, which corresponds to 292 kg of polymer per g of titanium, from which the amount of 2-EHA added is calculated as 0.95% by weight. Analytically determined residual contents of catalyst constituents are indicated in Table 2.

EXAMPLE 10

The titanium-containing catalyst component prepared in accordance with Example 6 was used. 100 liters of a hexane fraction (boiling range 63° to 70° C.) were initially introduced at room temperature into a 150 liter stirred vessel with the exclusion of air and moisture and heated to 35° C. 200 mmoles (=27.5 ml) of aluminum triethyl, 55.5 mmoles (=55.5 ml of a 1 molar hexane solution) of methyl p-toluylate and, finally, 1 mmole of titanium in the form of 2.88 g of the above catalyst component A were then added. The vessel contents were then heated to 50° C., whereupon propylene and hydrogen were begun to be passed in. 3.5 kg of propylene were taken up in the first half hour, during which period the temperature, despite thorough cooling, increased to 70° C. and the pressure in the vessel increased to 4.2 bar. At the same time an amount of hydrogen was metered in which was such that its concentration in the gas phase was 0.1% by volume. One hour after the start of the polymerization, 11.7 kg of propylene had been taken up and the internal pressure had reached 8 bar. After two hours, a total of 17.4 kg of propylene had been passed in under a now constant internal pressure of 8 bar, and the reaction had considerably slowed down. The vessel was let down, and, according to the expected yield, 16.4 g of 2-ethylhexanoic acid were then added at 70° C. Stirring was continued for a further 45 minutes at this temperature, the product was washed with 50 liters of hexane, and the polypropylene obtained was filtered off at this temperature and dried under nitrogen.

Yield: 11.3 kg, which corresponds to 236 kg of PP per g of titanium, from which the amount of 2-ethylhexanoic acid added is calculated as 1.45% by weight. The polymer had a bulk density of 440 g/l and an indentation hardness, measured according to DIN 53,456, of 81 N/mm$^2$. The melt flow index MFI 230/5 was 6.3 g/10 minutes.

In the polymerization, 3.9% by weight of soluble (atactic) polypropylene (relative to total polymer) were formed. Analytically determined residual contents of catalyst constituents are indicated in Table 2.

COMPARATIVE EXAMPLE 2

The polymerizations were carried out in accordance with Example 6, but a subsequent removal of catalyst residues by adding 2-ethylhexanoic acid was not carried out. The contents in the polymers of catalyst residues in relation to the catalyst yield are indicated in Table 2.

COMPARATIVE EXAMPLES 3 AND 4

Following the polymerization in accordance with Example 6, acetic acid (EA) was added in two different concentrations (c.f. Table 2). Even at a high concentration, no good removal of catalyst residues was obtained.

COMPARATIVE EXAMPLES 5 AND 6

The experiments were carried out with the addition of solutions of benzoic acid (BA) and palmitic acid (PA) in hexane (c.f. Table 2). No removal of catalyst residues was obtained.

EXAMPLE 11

A titanium-containing catalyst component prepared in accordance with German Auslegeschrift No. 1,795,197, Example 5, paragraph 1, was used and prepared as follows: 228 g of Mg(OC$_2$H$_5$)$_2$ (1 mole) were suspended in 1 liter of a gasoline fraction (boiling range 130°–170° C.), and 4 liters of a 1 molar TiCl$_4$ solution in this gasoline fraction were added. The suspension was boiled for 15 hours under reflux.

The precipitate was then washed six times, each time with the addition of 3 liters of the gasoline fraction, 15 minutes' stirring, settling out of the solids and decanting off of the supernatant mother liquor. The gasoline fraction above the solid should be free of titanium compound. The volume of the suspension was made up to 5 liters. The titanium content of the suspension was determined by colorimetry after the addition of H$_2$O$_2$. 10 ml of the suspension contained 2.1 mmoles of titanium compound. 100 liters of a gasoline fraction (boiling range 130° to 170° C.) were initially introduced at room temperature into a 150 liter stirred vessel with the exclusion of air and moisture. 440 mmoles (=60.4 ml) of aluminum triethyl and 4.2 mmoles of titanium in the form of 20 ml of a suspension of the above catalyst component in the gasoline fraction were then added. The vessel contents were heated to 85° C., whereupon an amount of hydrogen which was such that the internal pressure increased by 2 bar was injected. This was followed by ethylene being passed in for 6 hours at a rate of 4.5 kg/hour. The polymerization was stopped by gradually letting down the vessel. In accordance with the expected yield, 150 g of 2-ethylhexanoic acid were added. Stirring was continued for a further 30 minutes at 85° C. The polyethylene obtained was finally separated by filtration at 85° C. from the diluent and dried.

Yield: 25.7 g which corresponds to 128 kg of PE per g of Ti. From this the amount of 2-ethylhexanoic acid added is calculated as 0.6% by weight. Analytically determined residual contents of catalyst constituents are indicated in Table 3.

EXAMPLE 12 stirred for 30 minutes at 75° C., and the polyethylene was separated from the diluent and dried. Yield (after deduction of the amount initially introduced): 5.6 kg, which corresponds to 51 kg of PE per g of Ti. From this the amount of IOA added is calculated as 0.9% by weight. Analytically determined residual contents of catalyst constituents are indicated in Table 3.

TABLE 1

Removal of catalyst residues from polypropylene prepared with the use of a Ti component in accordance with German Offenlegungsschrift 2,830,039

| Example Number | Catalyst yield (kg of PP per g of Ti) | Treatment agent Type | (1) Amount (% by weight) | Treatment temperature (°C.) | Treatment time (min) | Analytical results (ppm by weight) | | | |
|---|---|---|---|---|---|---|---|---|---|
| | | | | | | Aluminum | Chloride | Magnesium | Titanium |
| 1 | 122 | 2-EHA | 0.2 | 70 | 30 | 59 | 54 | 23 | 3.5 |
| 2 | 101 | 2-EHA | 0.7 | 75 | 30 | 49 | 43 | 19 | 3.2 |
| 3 | 96 | 2-EHA | 1.0 | 60 | 30 | 42 | 37 | 17 | 2.5 |
| 4 | 107 | IOA | 0.5 | 50 | 60 | 63 | 55 | 23 | 3.5 |
| 5 | 126 | INA | 0.5 | 80 | 15 | 54 | 51 | 21 | 3.5 |
| C1 | 121 | — | — | 70 | 30 | 276 | 145 | 61 | 6.1 |

(1) relative to dry final product

TABLE 2

Removal of catalyst residues from polypropylene prepared with the use of a Ti component in accordance with German Offenlegungsschrift 2,643,143

| Example Number | Catalyst yield (kg of PP per g of Ti) | Treatment agent Type | (1) Amount (% by weight) | Analytical results (ppm by weight) | | | |
|---|---|---|---|---|---|---|---|
| | | | | Aluminum | Chloride | Magnesium | Titanium |
| 6 | 551 | 2-EHA | 0.33 | 44 | 57 | 15 | 1.5 |
| 7 | 531 | 2-EHA | 1.1 | 30 | 23 | 11 | 1.0 |
| 8 | 518 | INA | 0.5 | 47 | 41 | 16 | 1.6 |
| 9 | 292 | 2-EHA | 0.95 | 57 | 33 | 19 | 2.1 |
| 10 | 236 | 2-EHA | 1.45 | 53 | 31 | 18 | 1.8 |
| C2 | 527 | — | — | 145 | 79 | 39 | 1.8 |
| C3 | 514 | EA | 0.6 | 104 | 74 | 33 | 1.7 |
| C4 | 539 | EA | 3.2 | 101 | 71 | 27 | 1.6 |
| C5 | 546 | BA | 0.4 | 123 | 77 | 31 | 1.8 |
| C6 | 539 | PA | 1.2 | 127 | 82 | 29 | 1.9 |

(1) relative to dry final product

TABLE 3

Removal of catalyst residues from polyethylene prepared with the use of a Ti component in accordance with German Auslegeschrift 1,795,197

| Example Number | Catalyst yield (kg of PE per g of Ti) | Treatment agent Type | (1) Amount (% by weight) | Analytical results (ppm by weight) | | | |
|---|---|---|---|---|---|---|---|
| | | | | Aluminum | Chloride | Magnesium | Titanium |
| 11 | 128 | 2-EHA | 0.6 | 165 | 59 | 14 | 2 |
| 12 | 51 | IOA | 0.9 | 221 | 87 | 19 | 5 |
| C7 | 113 | — | — | 290 | 119 | 27 | 6 |

(1) relative to dry final product 0.5 kg of polyethylene powder from a preceding batch of the same type was initially introduced into a horizontal 10 liter reactor equipped with a wall-scraping stirrer. The contents were freed from air and moisture by repeated evacuation and thorough flushing with ethylene. The contents were heated up to 85° C., whereupon 50 mmols (32 6.85 ml) of aluminum triethyl and 2.3 mmoles of titanium in the form of 211 ml of the suspension of a catalyst component in accordance with Example 11 in a diesel oil fraction (boiling point 130°–160° C.) were added. 2.8 bar of hydrogen were injected, and ethylene was then passed in for 7 hours at a rate of 0.8 kg/hour. The reactor was then let down, and the polyethylene formed was drained off with stirring and under an $N_2$ blanket and slurried in 20 liters of hexane. 50 g of i-octanoic acid (IOA) were added, the mixture was

We claim:

1. A process for removing catalyst residues from polyolefins prepared by means of catalysts containing light metal halides and titanium and aluminum compounds by treating the polyolefin suspended in a liquid medium with an aliphatic monocarboxylic acid and separating off and washing out the polyolefin, which comprises carrying out the treatment with 0.1 to 1.5% by weight, relative to dry polyolefin, of a branched aliphatic monocarboxylic acid having 8 carbon atoms or its mixed isomers at a temperature of 40° to 90° C. for 10 to 120 minutes.

2. The process as claimed in claim 1, wherein 2-ethylhexanoic acid is used.

* * * * *